US012684427B2

(12) United States Patent
Kasi et al.

(10) Patent No.: US 12,684,427 B2
(45) Date of Patent: Jul. 14, 2026

(54) CELLULAR COMMUNICATION SESSION MANAGEMENT FOR USER EQUIPMENT (UES) IN IDLE MODE

(71) Applicant: T-Mobile USA, Inc., Bellevue, WA (US)

(72) Inventors: Narayanan Govindan Kasi, Olathe, KS (US); Saravana Velusamy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 341 days.

(21) Appl. No.: 18/055,266

(22) Filed: Nov. 14, 2022

(65) Prior Publication Data

US 2024/0163735 A1 May 16, 2024

(51) Int. Cl.
| | |
|---|---|
| *H04W 36/00* | (2009.01) |
| *H04W 8/08* | (2009.01) |
| *H04W 60/04* | (2009.01) |
| *H04W 76/19* | (2018.01) |
| *H04W 76/20* | (2018.01) |

(52) U.S. Cl.
CPC ......... *H04W 36/0033* (2013.01); *H04W 8/08* (2013.01); *H04W 76/19* (2018.02); *H04W 76/20* (2018.02); *H04W 60/04* (2013.01)

(58) Field of Classification Search
CPC ... H04W 36/0033; H04W 8/08; H04W 76/19; H04W 76/20; H04W 60/04; H04W 36/0022; H04W 36/14
USPC ......................................................... 370/331
See application file for complete search history.

(56) References Cited

U.S. PATENT DOCUMENTS

| | | | | | |
|---|---|---|---|---|---|
| 2012/0224564 | A1* | 9/2012 | Paisal | .................... | H04N 7/148 |
| | | | | | 370/331 |
| 2014/0226606 | A1* | 8/2014 | Nishigori | ................ | H04W 8/26 |
| | | | | | 370/329 |
| 2017/0171782 | A1* | 6/2017 | Mohamed | ........... | H04W 36/385 |
| 2020/0077315 | A1* | 3/2020 | Jin | ..................... | H04W 36/1443 |
| 2020/0245127 | A1* | 7/2020 | Zong | ................. | H04W 36/0066 |
| 2021/0258766 | A1* | 8/2021 | Watanabe | ............. | H04W 48/16 |
| 2022/0295355 | A1* | 9/2022 | Xin | ................... | H04W 36/0033 |

FOREIGN PATENT DOCUMENTS

| | | | | | |
|---|---|---|---|---|---|
| EP | | 3503623 A1 * | 6/2019 | ........ | H04W 36/1443 |

OTHER PUBLICATIONS

3GPP TS 23.401 V13.0.0 (Sep. 2014) (Year: 2014).*

* cited by examiner

*Primary Examiner* — Nicholas A Jensen
*Assistant Examiner* — Oladiran Gideon Olaleye
(74) *Attorney, Agent, or Firm* — Lee & Hayes, P.C.

(57) ABSTRACT

Described herein are techniques, devices, and systems for cellular communication session management for user equipment (UEs) in idle mode. Mobility management entities (MMEs) can receive context requests from access management functions (AMFs). The MMEs can transmit context responses without packet data network (PDN) information. The AMFs can utilize the context responses being received without the PDN information to establish 5G network communication connections for the UEs in the idle modes. The AMFs can establish the 5G network communication connections by performing initial setups, instead of performing 4G-5G handovers, based on the PDN information being left out of the context responses.

20 Claims, 4 Drawing Sheets

300

TRANSMIT, BY A MOBILE MANAGEMENT ENTITY (MME), A
HANDOVER REQUEST MESSAGE
302

RECEIVE, BY THE MME AND FROM AN ACCESS AND MOBILITY
MANAGEMENT FUNCTION (AMF), A CONTEXT REQUEST
MESSAGE UTILIZED TO REQUEST PACKET DATA NETWORK
(PDN) INFORMATION
304

TRANSMIT, BY THE AMF AND TO THE MME, A CONTEXT
RESPONSE WITHOUT THE PDN INFORMATION
306

400

CELLULAR COMMUNICATION SESSION MANAGEMENT FOR USER EQUIPMENT (UES) IN IDLE MODE

BACKGROUND

Cellular networks include core network nodes utilized to manage communication connections between user equipment (UEs) and the cellular networks. As cellular networks being offered by service providers are becoming increasingly diverse and complex, various types of resources may be unable to perform certain operations due to the resources being incompatible with some of the cellular networks. The resources, which receive requests for information associated with certain types of networks, may fail to properly respond to the requests that include information associated with other types of networks. Congestion, delay, and failed connections may become more common due to increasing numbers of unnecessary requests to some of the network resources.

For example, network function (NF) repository functions (NRFs) may be unsuccessful in responding to queries for fifth generation (5G) network information due to information in the queries being associated with non-5G networks. The queries which may be utilized to obtain 5G network information, such as 5G packet data network (PDN) gateway (PGW) internet protocol (IP) information, may be transmitted by access and mobility management functions (AMFs) that utilize PDN information to generate the queries. The PDN information, which may be provided by mobile management entities (MMEs), may include identifiers of PGWs. The PGW identifiers, which may be compatible with non-5G networks, including third generation (3G) networks, fourth generation (4G) networks, and so on, may not be compatible with 5G networks. Identifiers of non-5G network compatible PGWs may be included in the PDN information based on the non-5G network compatible PGWs being previously utilized for non-5G network communication connections for the UEs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
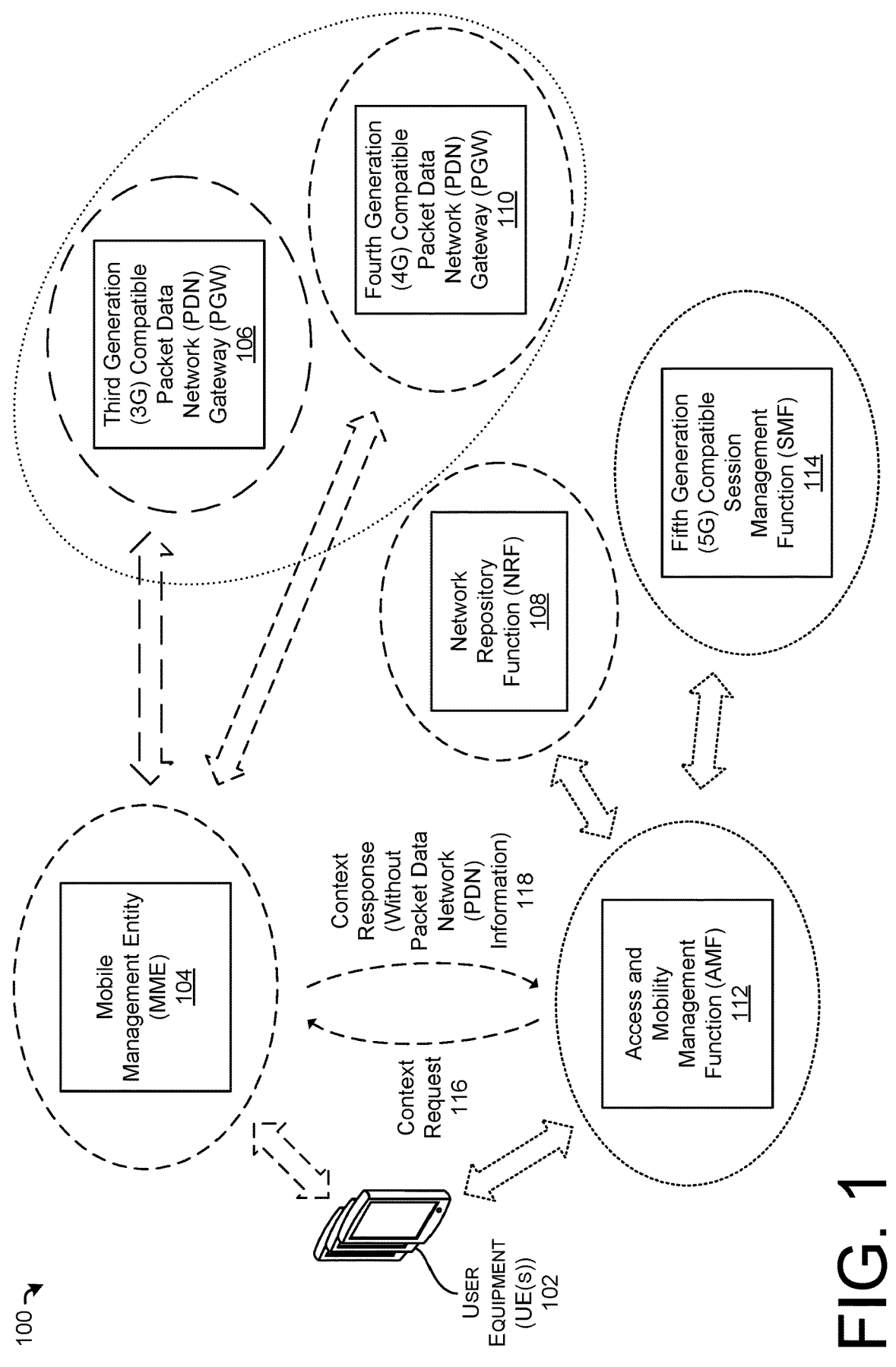
FIG. 1 schematically illustrates an example network environment for cellular session management for user equipment (UEs) in idle mode, in accordance with some examples of the present disclosure.

The techniques described herein present opportunities for service providers (or "network providers") to supply cellular services and to manage connections and sessions for user equipment (UEs) operating in idle mode.

Mobility management entities (MMEs) that receive context requests from access management functions (AMFs) can transmit context responses without packet data network (PDN) information. The MMEs receiving the context requests utilized by the AMFs to request identifiers of PDN gateways (PGWs) can transmit the context responses without the PDN information based on the identifiers not being associated with PGWs compatible with fifth generation (5G) networks. The context responses can be transmitted without the PDN information further based on the PGW identifiers being compatible with third generation (3G) networks and/or fourth generation (4G) networks. The AMFs can utilize the context responses being received without the PDN information to establish 5G network communication connections for the UEs in the idle modes.

The MMEs, which can receive the context requests utilized by the AMFs to request the PGW identifiers, can generate the context responses without the PDN information based on various types of information utilized to generate the context responses. The information utilized to generate the context responses can include context request information (e.g., information received in the context requests), and service tag information (e.g., information stored in the MMEs). The context request information can include the requested PGW identifiers being received in the context requests. The service tag information can include service tags indicating the PGWs being utilized to manage non-5G network communication connections for the UEs. The MMEs can determine to refrain from including the PDN information in the context responses based on PGWs the service tags being associated with non-5G network compatible PGWs, and the requested PGW identifiers being associated with 5G network compatible session management functions (SMFs).

The MMEs, which can refrain from including the PDN information in the context responses, can manage session information associated with the non-5G network communication connections based on MME management information. The MME management information can be utilized by the MMEs to delete the session information based on the 5G network communication connections being established, or to delete the session information based on the context request information and the service tag information. The MME management information indicating to the MMEs to delete the session information based on the 5G communication connections being established can be utilized by the MMEs to delete the session information based on the MMEs transmitting the context responses, and further based on the MMEs receiving, from the AMFs, notifications (e.g., acknowledgements) confirming registration of the UEs on 5G networks. The MME management information indicating to the MMEs to delete the session information based on the context request information and the service tag information can be utilized by the MMEs to delete the session information, and to transmit the context responses.

The sessions can be managed by the MMEs in various ways. In some examples, the context responses can be transmitted based on the session information being deleted. In other examples, the session information can be deleted based on the context responses being transmitted and/or the acknowledgements being received.

The AMFs can establish 5G network communication connections by performing new setups to register the UEs in the idle modes with the 5G networks based on the context responses being received without the PDN information. The new setups can be performed, instead of handovers, as initial registrations for the UEs. The AMFs can perform the initial registrations without transmitting queries to network function (NF) repository functions (NRFs) for session management function (SMF) information (e.g., SMF context information). The AMFs, which can determine to not perform the handovers based on the context responses being received without the PDN information, can refrain from transmitting the queries to the NRFs, perform the initial registrations, and transmit a context acknowledgement to the MMEs.

By implementing a 4G-5G handover procedure that evaluates types of context requests, and types of PGWs being utilized with MMEs for managing communication connections for UEs in idle modes, unnecessary queries to NRFs can be eliminated. AMFs receiving context responses transmitted by the MMEs based on the context requests can refrain from transmitting the NRF queries based on the context responses being received without PDN information. The MMEs can transmit the context responses without the PDN information associated with the PGWs being incompatible with 5G networks. Eliminating unnecessary NRF queries decreases network congestion, and decreases consumption of network resources, by conserving bandwidth that would otherwise be utilized for communication of other, valid, NRF queries according to conventional technology. The bandwidth being conserved can be reallocated for other purposes.

The techniques and systems described herein improve functions of compute resources by decreasing amounts of processing required by the compute resources, such as network nodes of various types, including MMEs, AMFs, NRFs, and so on, for exchanging NRF communications. By refraining from generating the unnecessary NRF queries, the AMFs are able to process context responses for establishing 5G network communication connections received from MMEs associated with non-5G network communication connections for UEs in idle modes more efficiently than in existing systems. The AMFs can establish new setups for the UEs in the idle modes based on the context responses as discussed herein, instead of attempting handovers resulting in unnecessary queries being transmitted to NRFs. As a result, the AMFs according to the techniques discussed herein process context responses more reliably and efficiently.

Because the NRFs do not receive the unnecessary queries (e.g., queries associated with PGWs being incompatible with 5G networks that would otherwise be received according to existing systems), the NRFs according to the techniques discussed herein can be utilized more efficiently for processing valid queries. Other, valid, queries, and the responses thereto, which are associated with PGWs being compatible with the 5G networks, can be processed by the AMFs and the NRFs more reliably and efficiently.

Additionally or alternatively, the AMFs can avoid processing demands that would otherwise be required in existing systems for sending unnecessary queries, based on the AMFS according to techniques discussed herein determining whether the context responses received from the MMEs do not include PDN information. The MMEs according to techniques discussed herein can refrain from including the PDN information in the context responses for the communication connections to be transferred from the 4G networks to the 5G networks, based on the communication connections having been previously transferred from the 3G networks to the 4G networks. The unnecessary queries can be avoided based on the MMEs determining the PGWs associated with the communication connections with the 4G networks are compatible with the 3G networks and the 4G networks, and further based on determining the PGWs associated with the communication connections are not compatible with the 5G networks.

Furthermore, different types of NRFs that exchange data between one another can operate more efficiently due to the unnecessary NRF queries associated with PGWs being incompatible with 5G networks not being sent. The NRFs, which can include local NRFs, can avoid exchanging unnecessary communications with global NRFs, in comparison to convention technology, based on the AMFs, as discussed herein, refraining from transmitting the unnecessary NRF queries associated with PGWs being incompatible with 5G networks. The compute resources associated with the local NRFs and the global NRFs can be conserved. By decreasing unnecessary consumption of compute resources in the NRFs, overloading of the local NRFs as well as the global NRFs can be prevented.

Furthermore, the techniques and systems described herein conserve storage resources due to amounts of time required by AMFs to process context responses being decreased in comparison to systems according to existing technology. By increasing levels of efficiency associated with the AMFs determining to establish new setups based on the context responses not including the PDN information, various network nodes, including the MMEs, the PGWs, serving gateways (SGWs), and so on, can decrease amounts of delays for deleting information related to the non-5G network sessions after the new setups are established.

Furthermore, the techniques and systems described herein improve network resources by increasing reliability of communication connections being transferred from the non-5G networks to the 5G networks (e.g., in particular, communication connections being transferred from the 3G networks to 4G networks, and then from the 4G networks to the 5G networks). Bandwidth of the networks can be improved, and response times to a multitude of devices connected to the networks can be decreased, based on the AMFs not transmitting unnecessary NRF queries (e.g., unnecessary NRF queries that may otherwise be transmitted as part of 4G-5G handovers according to conventional technology).

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for Cellular Session Management for User Equipment (UEs) in Idle Mode FIG. 1 schematically illustrates an example network environment 100 for cellular session management for user equipment (UEs) in idle mode, in accordance with some examples of the present disclosure.

The network environment 100 can include one or more user equipment (UE(s)) (e.g., UE(s) operating in idle mode) (or "UE(s) in idle mode") 102. The UE(s) 102 can be utilized to exchange communications, via a mobile telecommunications network (MTN) (e.g., a cellular network) (or "network") with one or more other UEs 102, and/or one or more other devices of various types (e.g., one or more devices of the same types as the UE(s) 102, one or more devices of different types than the UE(s) 102, etc.). The cellular network can include one or more cellular networks, including a fifth generation (5G) network, one or more non-5G networks including a fourth generation (4G) network and/or a third generation (3G) network, one or more other networks of the same type or different types, and/or any combination thereof.

The cellular network can include one or more network nodes (e.g., (e.g., network device(s)) of various types. The network node(s) can include a mobile management entity (MME) 104, a 3G network compatible packet data network (PDN) gateway (PGW) (e.g., a PGW in the 3G network) (or "3G compatible PGW") (or "3G PGW") 106, a network repository function (NRF) 108, a fourth generation (4G) network compatible PGW (e.g., a PGW in the 4G network) (or "4G compatible PGW") (or "4G PGW") 110, an access and mobility management function (AMF) 112, and a 5G network compatible session management function (SMF) (e.g., a SMF in the 5G network) (or "5G compatible SMF") (or "SMF") 114.

Service providers, including wireless carriers (or "operators"), provide their users (e.g., one or more users of the UE(s) 102) (or "subscribers") (or "customers") with access to a variety of types of services over a variety of types of telecommunication networks being included in, or separate from, the cellular network. Such networks can include one or more networks that support one or more 3GPP standards, such as, but not limited to, the 5G network, the 4G network, the 3G network, and so on. However, the disclosed systems and techniques may be applicable in any network or system in which the UEs request and receive access to exchange communications using any protocol.

The MME 104, which can be utilized along with a non-5G network (e.g., a 4G network, a 3G network, etc.) compatible PGW, such as the 3G PGW 106 or the 4G PGW 110, to manage one or more non-5G network communication connections (e.g., one or more 3G communication connections, one or more 4G communication connections, etc.) and/or one or more non-5G sessions, for the UE(s) 102, can exchange one or more communications (or "message(s)") with the AMF 112 to establish one or more 5G network communication connections and/or one or more 5G sessions for the UE(s) 102.

In some examples, the communication(s) (e.g., one or more communications associated with a communication connection for a UE (e.g., one of the UE(s) 102) being exchanged between the MME 104 and the AMF 112 can include a context request 116 and/or a context response (without PDN connection information (or "PDN information") 118 (the context response without PDN information also being referred to herein, simply, as "context response").

In some examples, the context request 116 can be communicated via an N26 interface between the MME 104 and the AMF 112, or an interface of another type. In those or other examples, the context response 118 can be received via the N26 interface between the MME 104 and the AMF 112, or an interface of another type.

The MME 104 can identify context request information in the context request and utilize the context request information to transmit the context response 118. The context request information can include handover information (e.g., information and/or one or more identifiers associated with a handover process (e.g., a non-5G network-5G network handover process) (e.g., a 4G-5G handover process) (or "4G-5G handover")), source device information (e.g., one or more identifiers of a source device, such as the AMF 112, from which the context request 116 is received), network information (e.g., one or more identifiers of a source network, such as one of the non-5G network(s), to which the UE 102 is currently connected, one or more identifiers of a destination network, such as the 5G network, to which the UE 102 is to be connected etc.), and/or one or more other types of information associated with one or more portions, devices, and/or nodes of the network, including the MME 104, the AMF 112, one or more other network nodes, the UE(s) 102, one or more other UE(s) 102 and/or other devices, and so on.

Various types of information (e.g., the context request information, service tag information, etc.) which can be received and analyzed by the MME 104 to determine to transmit the context response 118, can be utilized by the MME 104 to generate and transmit the context response 118 without the PDN information (e.g., the context response 118 with the PDN information being absent). One or more of the source device information, the network information, and/or the other type(s) of information included in the context request information can be utilized by the MME 104 to transmit the context response 118. The MME 104, which can transmit the context response 118, can refrain from including the PDN information in the context response 118 based on the context request information.

In some examples, the MME 104 can transmit the context response 118 without the PDN information based on determining a current PGW (e.g., one of the non-5G network compatible PGW(s), such as the PGW 106, the PGW 110, etc.) associated with a current communication connection (e.g., a non-5G communication connection) is not compatible (e.g., incompatible) with the 5G network. In those or other examples, the MME 104 can transmit the context response 118 without the PDN information based on determining the current PGW (e.g., the PGW 106, the PGW 110, etc.) is unusable as a session management function (SMF) of the 5G network.

The MME 10 can utilize various type of information (e.g., context related information) to determine to transmit the context response 118. In some examples, the context request 116 can be exchanged between the MME 104 and the AMF 112 as part of the handover process (e.g., the non-5G network-5G network handover). The context related information can include the context request information, information (e.g., the PDN information) associated with the PDN, information associated with one or more PGWs (e.g., the non-5G network compatible PGW(s), such as the PGW 106, the PGW 110, etc.), security related information (e.g., information utilized for registration of the UE 102), internet protocol (IP) address information (e.g., IP address information associated with the non-5G network compatible PGWs (e.g., the PGW 106, the PGW 110, etc.)), etc., and/or any combination thereof. The information associated with the PDN can include one or more identifiers of the PDN.

In some examples, the information associated with the PGW(s) can include a fully qualified domain name (FQDN) associated with a non-5G network compatible PGW (e.g., any of the non-5G network compatible PGWs, such as the PGW 106, the PGW 110, etc.). In those or other examples, the information associated with the PGWs (e.g., one or more non-5G network compatible PGWs, such as the PGW 106, the PGW 110, etc.) can be included in the information associated with the PDN.

In some examples, the PGW information (e.g., the information associated with the PGW(s)) in the context related information can be associated with a current network (e.g., a non-5G network) to which the UE 102 is connected and/or a current communication connection (e.g., a non-5G network communication connection) being utilized by the UE 102. In those or other examples, for instance with any of the non-5G network compatible PGWs (e.g., the PGW 106 or the PGW 110) being utilized for a current 4G network communication connection for the UE 102 (e.g., a current network communication connection, as represented in FIG. 1 by the smallest sized dashed lines) (e.g., the 4G communication connection 204, as discussed below with reference to FIG. 2), subsequent to any of the non-5G network compatible PGWs (e.g., the PGW 106 or the PGW 110, being the same, or different, PGW, utilized for the 4G network communication connection) being utilized (e.g., previously utilized) for a 3G network communication connection for the UE 102 (e.g., a previous network communication connection, as represented in FIG. 1 by the largest sized dashed lines) (e.g., the 3G communication connection 202, as discussed below with reference to FIG. 2), the context related information can include information associated with the non-5G network compatible PGW (e.g., the PGW 106 or the PGW 110, being currently utilized for the 4G communication connection).

Although the MME 104 can utilize a determination that the non-5G network compatible PGW (e.g., the PGW 106 or the PGW 110) is utilized for the current non-5G network connection to leave out the PDN information from the context response 118 as discussed above in the current disclosure, it is not limited as such. In some examples, the MME 104 can utilize a determination that the non-5G network compatible PGW (e.g., the PGW 106 or the PGW 110) for the current non-5G network connection is compatible with the 3G network and the 4G network, but not the 5G network, to refrain from including the PDN information from the context response 118. In alternative or additional examples, the MME 104 can utilize a determination that the non-5G network compatible PGW (e.g., the PGW 106 or the PGW 110) for the current non-5G network connection is not compatible with the 5G network, regardless of whether the non-5G network compatible PGW (e.g., the PGW 106 or the PGW 110) is compatible with the 3G network and/or the 4G network, to refrain from including the PDN information from the context response 118. In those or other examples, the MME 104 can omit any determination of whether the non-5G network compatible PGW (e.g., the PGW 106 or the PGW 110) is compatible with the 3G network and/or the 4G network.

In some examples, the MME 104 can omit any determination of whether the non-5G network compatible PGW (e.g., the PGW 106 or the PGW 110) is compatible with the 5G network, based on determining the non-5G network compatible PGW (e.g., the PGW 106 or the PGW 110) is compatible with the 3G network. In those or other examples, the MME 104 can infer, based on determining the non-5G network compatible PGW (e.g., the PGW 106 or the PGW 110) is compatible with the 3G network, that the non-5G network compatible PGW (e.g., the PGW 106 or the PGW 110) is not compatible with the 5G network.

In some examples, the 4G network communication connection can be a current connection based on a 3G-4G handover being previously performed for the UE 102 having been previously connected to the 3G network, the 3G-4G handover being utilized to connect the UE 102 to the 4G network. The information associated with the non-5G network compatible PGW (e.g., the PGW 106 or the PGW 110) can include a PGW identifier (e.g., the PGW FQDN).

The context response 118 can include context response information identified by the MME 104, based on the context related information and/or the service tag information. In some examples, the context response information can include the service tag information and/or one or more portions of the context related information, except for the PDN information (e.g., the information, such as the identifier(s), associated with the PDN, the PGW identifier associated with the non-5G network compatible PGW, etc.). In those or other examples, the one or more portions of information in the context response information can include the security information, the IP address information, etc., and/or any combination thereof. In those or other examples, the context response information, without the PDN information, can include some or all of the remaining portions of the context related information, and/or one or more other portions of information identified by the MME 104.

In some examples, the MME 104 can identify information (e.g., the context response information) to be utilized for one or more context response messages (e.g., the context response 118), based on one or more domain name system (DNS) queries being ran by the MME 104 with a DNS. The DNS can be utilized to identify PGW information, including one or more services supported by the non-5G network compatible PGW(s) (e.g., the PGW 106, the PGW 110, etc.) for the 3G-4G handover and/or the 4G-5G handover. In some examples, the MME 104 can store the PGW information in a cache of the MME 104, which can be accessed alternatively or additionally to the information obtained via the DNS query(ies). The information stored in the MME 104 can be stored for a period of time (e.g., 10 minutes (m), 20 m, 30 m, 1 hour, etc.) so that the MME 104 does not have to query the DNS every time. The MME 104 can identify, based on the information (e.g., one or more service tags) received from the DNS, whether the non-5G network compatible PGW(s) (e.g., the PGW 106, the PGW 110, etc.) is able to support 5G or not.

In some examples, the received service tag(s) can be utilized to determine whether the non-5G network compatible PGW(s) (e.g., the PGW 106, the PGW 110, etc.) support, and/or are compatible with, the 5G network. The DNS query(ies) can be transmitted, and/or information in the MME cache can be obtained, by the MME 104, based on the MME 104 receiving the context request 116. In those or other examples, the MME 104 can determine, based on one or more of the service tag(s) missing from the information received from the DNS or the MME cache, that the non-5G network compatible PGW(s) (e.g., the PGW 106, the PGW 110, etc.), respectively, so not support, and/or are not compatible with, the 5G network (e.g., the MME 104 can refrain from transmitting the PDN information based on the service tag(s) missing).

In those or other examples, the MME 104 can identify information (e.g., the context response information) to be utilized for one or more context response messages (e.g., the context response 118), based on information received from the non-5G network compatible PGW(s) (e.g., the PGW 106, the PGW 110, etc.). The information received from the non-5G network compatible PGW(s) (e.g., the PGW 106, the PGW 110, etc.) can include an international mobile subscriber identity (IMSI), access point name (APN) information (e.g., information including an APN and indicating whether the UE 102 is requesting access to various services (e.g., the internet, emergency services, an IP multimedia system (IMS) a (e.g., a voice call), etc.). The APN can be associated with the non-5G network compatible PGW(s) (e.g., the PGW 106, the PGW 110, etc.). In some examples, the session information can include the context related information and/or the context response information, and/or vice versa.

The MME 104 can manage session information (also referred to herein, simply, as a "session") (e.g., information associated with the session utilized for the non-5G network communication connection which was to be utilized to identify, determine, and/or generate the PDN information to be included in the context response 118) in various ways. The session information can include one or more portions of the context response information and one or more other types of information.

In some examples, for instance with the context request 116 being utilized by the AMF 112 to establish a 5G communication connection (e.g., the 5G communication connection 214, as discussed below with reference to FIG. 2) for the UE 102, the MME 104 can maintain storing of the session information based on the context request 116. In those or other examples, the MME 104 can store the session information utilized to previous establish the non-5G network connection (e.g., the 4G network communication connection), and, based on receiving an acknowledgement (e.g., a context acknowledgement) from the AMF 112, delete session information associated with the non-5G network communication connection. The session information being stored in the MME 104, but not deleted based on the context response 118 being transmitted (e.g., the MME 104 can wait to delete the session information), can be deleted based on the acknowledgement received from the AMF 112.

In some examples, the acknowledgement can be transmitted by the AMF 112 based on the AMF 112 refraining from configuring an SMF as part of the handover. Instead of performing the handover, the AMF 112 can perform an initial setup for the 5G communication connection and/or the 5G session (e.g., the 4G session can be ended and the 5G session can be initiated). The initial setup can include the AMF 112 registering the UE 102, transmitting a registration request message (e.g., initial registration request message) including UE information associated with the UE 102 to a unified data management (UDM), and receiving a registration response message from the UDM.

In some examples, performance of the AMF 112 of the initial setup can include a context setup not being performed as part of the handover, due to the PDN information having been omitted from the context response 118. In those or other examples, the context setup not being performed can include an N11 interface SMF context not being performed as part of the handover. In those or other examples, based on the context response 118 not including the PDN information, the PDN connection that would otherwise have been utilized by the AMF 112 had the MME 104 included the PDN information in the context response is not setup. Instead, the MME 104 informs the current PGW (e.g., the PGW 106 or the PGW 110), and the SGW, to delete the current session (e.g., the non-5G session), and an initial setup for a PDN utilizing the SMF 114 is performed.

The session information being stored in the MME 104 at a time at which the context response 118 is transmitted can be deleted at a time at which the acknowledgement is received by the MME 104 and from the AMF 112. By maintaining the session information being stored in the MME 104, the communication connection to the 4G network can be utilized (e.g., maintained, reestablished, etc.) based on a failure of establishing the 5G network communication connection. In some examples, the session information stored in the MME 104 can be utilized for the 4G network communication connection based on determining a period of time beginning from a time at which the context response 118 is transmitted to a current time us greater than or equal to a threshold period of time. In alternative or additional examples, the session information stored in the MME 104 can be utilized for the 4G network communication connection based on the MME 104 receiving a failure notification from the AMF 112.

In some examples, for instance with the context request 116 being utilized by the AMF 112 to establish the 5G communication connection for the UE 102, the MME 104 can delete the session information based on the context request 116 being received, based on the MME 104 determining to transmit the context response 118, and/or based on the MME 104 transmitting the context response 118. In those or other examples, the session information, based on determining to transmit the context response 118, can be deleted at a time prior to transmitting the context response 118, deleted at a time at which the context response 118 is transmitted, or deleted at a time subsequent to transmitting the context response 118 (e.g., deleted prior to determining a period of time beginning from a time at which the context response 118 is transmitted to a current time is greater than or equal to a threshold period of time, deleted prior to a time at which the acknowledgement is received from the AMF 112, or deleted at any other time).

By deleting the session information regardless of whether the acknowledgement is received from the AMF 112, such as at a time at which the MME 104 receives the context request 116, the MME 104 can determine the context response 118 is to be transmitted without the PDN information based on determining that there is no longer any session information stored in the MME 104. In some examples, the MME 104 can receive the context request 116, delete the session information based on the context request 116 being received, and transmit the context response 118 without the PDN information based on determining no session information is stored in the MME 104.

In those or other examples, the deleting of the session information based on the context request 116 being received can include deleting the session information based on the context request information in the context request 116. In those or other examples, the session information can be deleted based on the context request information indicating that the communication connection for the UE 102 is the non-5G network communication connection and/or that the non-5G network compatible PGW (e.g., the PGW 106 or the PGW 11) is utilized for the current communication connection for the UE 102. In those or other examples, the session information can be deleted further based on determining the context request information indicates the source device of the context request 116 is the AMF 112, based on determining the context request 116 is being utilized to establish a 5G communication connection for the UE 102, and/or based on identifying the context request 116 is associated with the 4G-5G handover.

Although the MME 104 can manage the session information in various ways as discussed above in the current disclosure, it is not limited as such. In some examples, one or more of the various techniques utilized by the MME 104 as discussed throughout the disclosure to manage (e.g., delete) the session information can be performed based on MME management information stored in the MME 104. One or more other network nodes (e.g., the AMF 112) can manage session information stored in the other network node(s), respectively, in a similar way as, or different way from, how the MME 104 manages the session information.

In some examples, other session information being managed by the other network node(s) (e.g., the PGW 106, the PGW 110, the AMF 112, a session gateway (SGW) associated with the non-5G network communication connection) can be based on messages received from the MME 104, and/or session related information (e.g., information received from the MME 104 that is similar to, or different from, the MME management information) being included in the messages. In those or other examples, the messages received from the MME 104 can be utilized by the other network nodes to delete the other session information in the other network nodes based on the session related information. In those or other examples, the other network node(s) can determine, based on the session related information, to optionally manage the other session information according to the session related information. In alternative examples, the session related information can mandate the other network node(s) to delete the other session information in a similar way as for the MME 104, and/or as indicated in the session related information (e.g., the MME 104 can mandate one or more of the other network node(s) (e.g., the PGW 106, the PGW 110, the AMF 112, the SGW, etc.) to delete the other session information upon receipt of the message including the session related information).

In some examples, the MME 104 can set a session information delete flag (or "session delete flag"). The session information delete flag, which can be set based on the MME 104 determining to delete the session information, can be utilized for any of the techniques discussed above, such as for deleting the session information and/or transmitting communications. By way of example, the MME 104 can set the session information delete flag based on the acknowledgement being received from the AMF 112. By way of another example, the MME 104 can determine to transmit the context response 118 based on the session information delete flag being set. The MME 104 can delete the session information based on the session information delete flag being set. The MME 104 can transmit the session information delete flag as part of any communications, as discussed above, utilized to inform the network node(s) (e.g., the AMF 112) to delete the session information. In some examples, the MME 104 can transmit the session delete flag to the SGW, the SGW forwarding the session delete flag to the PGW, the PGW deleting session information (e.g., the session information including an international mobile subscriber identity (IMSI) associated with a previous session utilized by the UE 102) based on the session delete flag.

The AMF 112 can establish a subsequent (e.g., future) (e.g., next) network communication connection, as represented in FIG. 1 by the largest sized dotted lines, as a 5G network communication connection, based on the context response 118 being received without the PDN information. The AMF 112 can establish, based on the PDN information missing from the context response 118, the 5G network communication connection. The 5G network communication connection can be established as the initial setup (e.g., registration process) of the 5G network communication connection. The AMF 112 can perform the initial setup instead of the 4G-5G handover. By performing the initial setup, the AMF 112 can establish the 5G network communication connection utilizing the SMF 114 instead of the non-5G network compatible PGW (e.g., the PGW 106 or the PGW 110). The non-5G network compatible PGW (e.g., the PGW 106 or the PGW 110) that was utilized for the non-5G network communication connection will not be utilized for the 5G network communication connection; and the SMF 114 can be utilized for the 5G network communication connection based on the initial setup.

The NRF 108 that would otherwise be queried by the AMF 112 for session management function (SMF) information does not need to be queried by the AMF 112 based on the AMF 112 receiving the context response 118 without the PDN information. The AMF 112 can receive the context response 118 and refrain from querying the NRF 108 based on determining the context response 118 does not include the PDN information. The AMF 112, based on determining the context response 118 does not include the PDN information, can perform the initial setup instead of querying the NRF 108 as part of the handover from the non-5G network to the 5G network. The AMF 112 can establish the 5G communication connection utilizing the SMF 114. The AMF 112 can transmit the acknowledgment to the MME 104, the acknowledgment including information (e.g., one or more identifiers) associated with the SMF 114.

Therefore, and as described herein, NRFs receive (e.g., the NRF 108) fewer queries for information related to 4G-5G handovers requested to be performed utilizing non-5G network compatible PGWs (e.g., of the non-5G network compatible PGW (e.g., the PGW 106 or the PGW 110). Because PGWs that are compatible with 3G networks can be utilized for 3G network communication connections and/or possibly 4G network communication connections, and because the PGWs that are compatible with the 3G networks may not be compatible with 5G networks, NRFs may be unable to process queries for 4G-5G handovers based on the received PDN information (e.g., the PGW identifier(s) and/or the FQDN(s) received from the MMEs) being associated with 3G compatible PGWs.

Because the queries for 4G-5G handovers being transmitted to NRFs utilizing PDN information (e.g., the PGW identifier(s) and/or FQDN(s)) associated with non-5G network compatible PGWs (e.g., the 3G network compatible PGWs) may fail if attempted, and/or the 4G-5G handovers requested to be performed utilizing the non-5G network compatible PGWs (e.g., the 3G network compatible PGWs) may fail, transmitting context responses without PDN information to inform AMFs to perform initial setups (e.g., inform the AMFs to perform initial setups instead of 4G-5G handovers, based on non-5G PGWs currently being utilized for 4G network commination connections) can conserve network, storage, and compute resources. The network, storage, and compute resources can be conserved as a result of decreased numbers of unnecessary queries being transmitted to NRFs, as well as decreased numbers of unnecessary messages being exchanged between NRFs (e.g., between local NRFs and global NRFs).

Although the 4G PGW 110 may be incompatible with the 5G network, as discussed above according to the current disclosure, it is not limited as such. In some examples, the 4G PGW 110 may be incompatible with the 3G network and compatible with the 5G network. The MME 104 can determine, for example with such instances with the context request 116 being associated with a current communication connection utilizing the 4G PGW 110 and not the 3G PGW 106, to transmit a context response including the PDN information based on determining the 4G PGW 110 is compatible with the 5G network.

Although the non-5G networks (e.g., the 3G network and the 4G network) and the 5G networks may include the various techniques as discussed throughout the current disclosure, it is not limited as such. Other networks of various types can be implemented in similar ways as for the non-5G networks (e.g., the 3G network and the 4G network), respectively, and/or another network, being a same or different type of network from among networks of various types utilized to implement the non-5G networks, can be implemented in similar ways as for the 5G network, with any or all of the other networks being utilized to implement any of the techniques as discussed herein.

Although the network environment includes UE(s) 102 operating in idle mode as discussed above in the current disclosure, it is not limited as such. In some examples, the UE(s) 102 can include one or more devices of any type and operating in any mode, the device(s) being capable of engaging in wireless communication with one or more other devices (e.g., remote devices) (UE(s)) of any type and operating in any mode. Thus, UE(s) 102 can include, but are not limited to, one or more smart phones, one or more mobile phones, one or more cell phones, one or more tablet computers, one or more portable computers, one or more laptop computers, one or more personal digital assistants (PDAs), one or more electronic book devices, or one or more of any other portable electronic devices that can generate, request, receive, transmit, or exchange voice, video, and/or digital data over the cellular network(s). In various embodiments, any of the UE(s) 102 can be a transmitting device, a receiving device, a combined transmitting and receiving device, and so on.

Although the PGW 106, the PGW 110, and the SMF 114 can be utilized for various communication connection(s), as discussed above in the current disclosure, it is not limited as such. One or more PGWs (e.g., the PGW 106 and/or the PGW 110) and/or the SMF 114 utilized in the cellular network can include one or more traffic transfer devices (or network devices), such as a gateway, a router, a switch, a firewall, a network interface controller (NIC), a hub, a bridge, a proxy server, an optical add-drop multiplexer (OADM), or some other type of device that processes and/or transfers traffic. In one example implementation, the PGWs (e.g., the PGW 106 and/or the PGW 110) and/or the SMF 114 can provide connectivity of the UE(s) 102 to PDNs (e.g., external PDNs) by being a traffic exit/entry point for the UE(s) 102. The UE(s) 102 can simultaneously connect to more than one of the PGWs (e.g., the PGW 106 and/or the PGW 110) and/or the SMF 114 for accessing multiple PDNs. The PGWs (e.g., the PGW 106 and/or the PGW 110) and/or the SMF 114 can perform policy enforcement, packet filtering for each user, charging support, lawful intercept, and packet screening. The PGWs (e.g., the PGW 106 and/or the PGW 110) and/or the SMF 114 can also act as an anchor for mobility between 3GPP and non-3GPP technologies.

Although the cellular network can include the 3G compatible PGW 106 and the 4G compatible PGW 110, as discussed above in the current disclosure, it is not limited as such. In some examples, one or more of the 3G compatible PGW 106 and the 4G compatible PGW 110 can be compatible with one or more non-5G networks, such as the 4G network, the 3G network, etc. In those or other examples, one or more of the 3G compatible PGW 106 and the 4G compatible PGW 110 can be integrated as separate PGWs (e.g., individual PGWs in the 3G network and the 4G network, respectively), or as a PGW (e.g., a single PGW in one or more non-5G networks, including the 3G network, the 4G network, etc., as represented in FIG. 1 by the smallest sized dotted line) (or "combined PGW") being compatible with one or more non-5G networks, such as the 4G network and the 3G network, and/or one or more other non-5G networks.

In those or other examples, any of one or more of the 3G compatible PGW 106 and the 4G compatible PGW 110 being separate PGWs, the single PGW, and/or any combination thereof, can be utilized, in a similar way as for one or more of the 3G compatible PGW 106 and the 4G compatible PGW 110, to implement any of one or more of the 3G compatible PGW 106, the 4G compatible PGW 110, one or more other non-5G network compatible PGWs, and/or any combination thereof, according to any of the techniques discussed here.

Although the network environment can include the MTN, which can include the 5G network, the 4G network, and/or the 3G network, as discussed above in the current disclosure, it is not limited as such. In some examples, the MTN can be configured to implement one or more of the 5G network, the 4G network, the 3G network, a second generation (2G) network, etc., via one or more 5G, 4G, 3G, 2G, etc. cellular wireless access technologies, respectively. The MTN can implement one or more of 5G, LTE/LTE Advanced (LTE-A), evolved high-speed packet access (HSPA+), universal mobile telecommunications system (UMTS), global systems for mobile (GSM), etc., telecommunications technologies, LTE, LTE-A, and HSPA+, being examples of 4G telecommunications technologies, UMTS being an example of 3G telecommunications technologies, GSM being an example of 2G telecommunications technologies, and so on.

In alternative or additional examples, one or more of the telecommunications technologies can include one or more base stations, one or more access points (e.g., Wi-Fi base station(s) (e.g., using one or more Wi-Fi standard such as 802.11 a/b/g/n/etc.)), one or more remote service devices (e.g., one or more PGWs, one or more evolved PGWs (e.g., EPG(s)), etc.), and/or one or more network nodes of various types. The base station(s), the access point(s), and the remote service device(s) in the GSM, UMTS, LTE, LTE-A, HSPA+, and/or 5G telecommunications technologies can include, but are not limited to, network components including: one or more base transceiver stations (BTSs) (e.g., NodeBs, Enhanced-NodeBs (eNodeBs)), one or more radio network controllers (RNCs), one or more serving general packet radio service (GPRS) support nodes (SGSNs), one or more gateway GPRS support nodes (GGSNs), proxies, one or more mobile switching centers (MSCs), one or more base station controllers (BSCs), one or more PGWs (e.g., the PGW 106 and/or the PGW 110), one or more SGWs, one or more MMEs (e.g., the MME 104), one or more evolved-universal mobile telecommunications system (UMTS) terrestrial radio access networks) (E-UTRANs), one or more evolved packet data gateways (e-PDGs), one or more AMFs (e.g., the AMF 112), one or more one or more SMFs (e.g., the SMF 114), and/or any other data traffic control entity configured to communicate, convert, and/or route data packets for the UE(s) 102.

The network components can be configured with hardware and software to provide network performance metrics indicating a QoS and/or QoE of the network and/or provide channel coding feedback based on the network performance metrics in order to provide real time communication. While FIG. 1 illustrates the MME 104, the PGW 106, the NRF 108, the PGW 110, the SMF 114, and the AMF 112, it is understood in the context of this disclosure, that the techniques discussed herein can also be implemented in other networking technologies, such as nodes that are part of a wide area network (WAN), metropolitan area network (MAN), local area network (LAN), neighborhood area network (NAN), personal area network (PAN), or the like.

Although the MME 104, the PGW 106, the NRF 108, the PGW 110, the SMF 114, and the AMF 112 can be included in the cellular network as discussed above in the current disclosure, it is not limited as such. In some examples, the MME 104, the PGW 106, the NRF 108, the PGW 110, the SMF 114, the AMF 112, one or more other nodes, or any combination thereof, can be implemented as individual nodes (e.g., different devices), respectively. In those or other examples, the MME 104, the PGW 106, the NRF 108, the PGW 110, the SMF 114, the AMF 112, one or more other nodes, or any combination thereof, can be implemented by one or more nodes (e.g., integrated devices).

Figure 2:
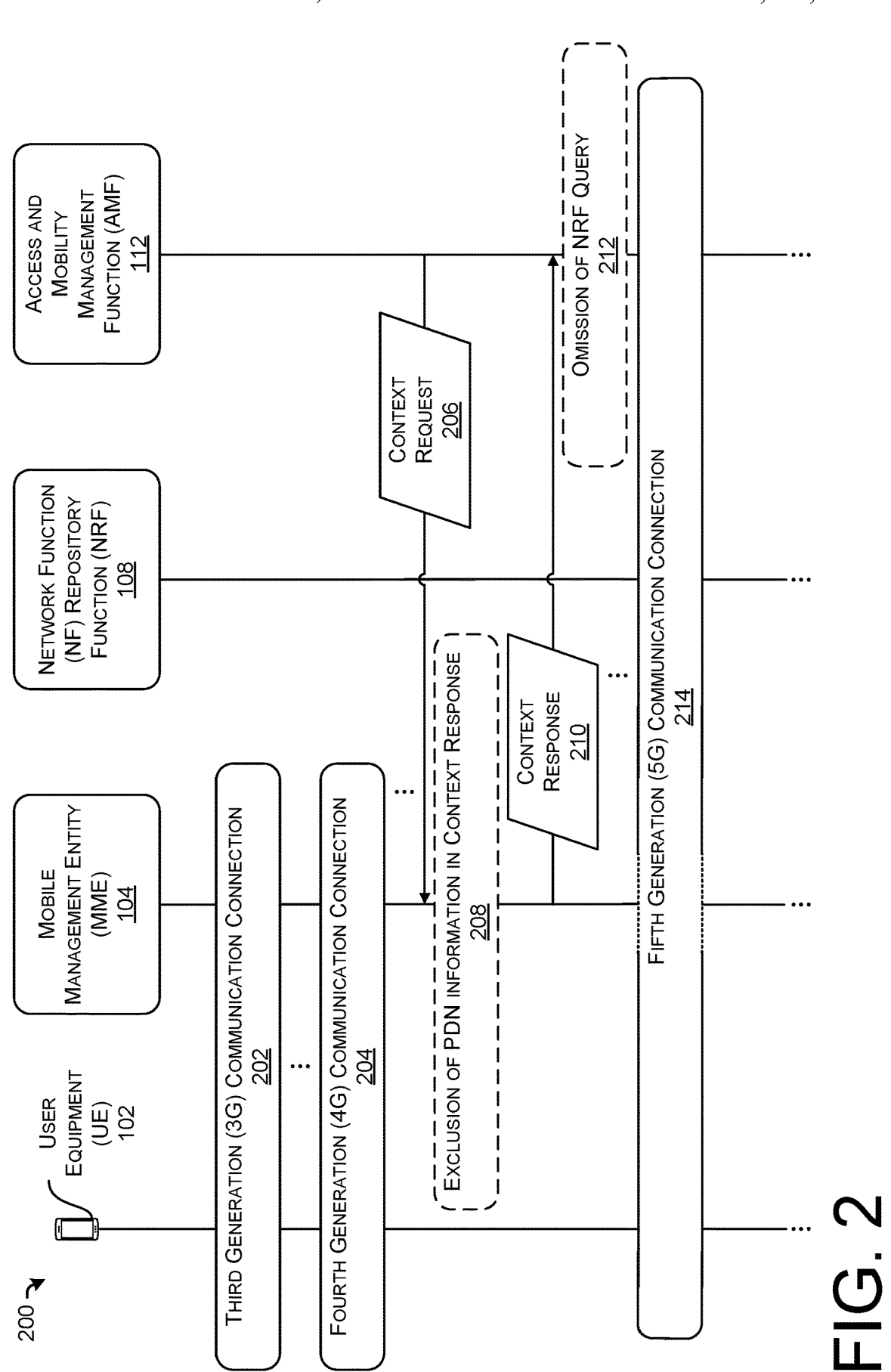
FIG. 2 is a diagram of an example signal flow for cellular session management for user equipment (UEs) in idle mode, in accordance with examples of the disclosure.

FIG. 2 is a diagram of an example signal flow 200 for cellular session management for user equipment (UEs) in idle mode, in accordance with examples of the disclosure. As illustrated, the signal flow 200 includes interactions between various devices in a cellular network (e.g., the MTN, as discussed above with reference to FIG. 1), the devices including a user equipment (e.g., any of the UE(s) 102, as discussed above with reference to FIG. 1), a mobile management entity (MME) (e.g., the MME, as discussed above with reference to FIG. 1), a network function (NF) repository function (NRF) (e.g., the NRF 108, as discussed above with reference to FIG. 1), and an access and mobility management function (e.g., the AMF 112, as discussed above with reference to FIG. 1).

The UE 102 and the MME 104 can be utilized along with one or more network nodes (e.g., the third-generation (3G) network compatible packet data network (PDN) gateway (PGW) 106) and one or more other network nodes to establish a 3G network communication connection (or "3G communication connection") 202. The 3G communication connection 202 can be utilized by the UE 102, and via a 3G network, for exchanging communications with one or more of the UE(s) 102 and/or one or more other devices.

The UE 102 and the MME 104 can be utilized along with one or more network nodes (e.g., the fourth-generation (4G) network compatible PGW 110) and one or more other network nodes to establish a 4G network communication connection (or "4G communication connection") 204. The 4G communication connection 204 can be utilized by the UE 102, and via a 4G network, for exchanging communications with one or more of the UE(s) 102 and/or one or more other devices.

In some examples, a handover (e.g., a first handover) between the 3G network and the 4G network can be performed for the UE 102. The 3G-4G handover can be performed based on i) a UE context release performed by a NodeB of the 3G network, and ii) a resource allocation performed by an eNodeB of the 4G network.

The 3G-4G handover can be performed based on the MME 104 receiving, from a mobile switching center (MSC) server connected to the NodeB in the 3G network, a handover initiation message (e.g., a first handover initiation message), and based on the MME 104 transmitting, to a serving general packet radio service support node (SGSN), a context request message (e.g., a first context request message). The MME 104 can transmit, to a PGW (e.g., a non-5G network compatible PGW (e.g., the PGW 106 or the PGW 110)), via a serving gateway (SGW), a bearer message to perform the 3G-4G handover based on the first handover initiation message. The 3G-4G handover can be performed based on various messages, including the bearer message, associated with nodes of the 3G network and the 4G network.

The 3G-4G handover can be performed further based on the MME 104 receiving, from the SGSN, a context response message (e.g., a first context response message) including UE contexts, and further based on the MME 104 transmitting, to an eNB in the 4G network, a handover request message (e.g., a second handover request message including bearer request information), initiating the handover from the 3G network to the 4G network.

In those or other examples, the handover between the 3G and the 4G network can be performed further based on the MME 104 receiving, from the eNB, a handover acknowledgement message indicating setup of bearer contexts based on the bearer request information. The 3G-4G handover can be performed further based on the MME 104 transmitting, to the non-5G network compatible PGW (e.g., the PGW 106 or the PGW 110), via a serving gateway (SGW), a modify bearer request message based on the UE 102 accepting establishing of the bearer contexts. The 3G-4G handover can be performed further based on the MME 104 receiving from the non-5G network compatible PGW (e.g., the PGW 106 or the PGW 110), and via the SGW, a modify bearer response message indicating an update of an address of the eNB in the SGW.

In those or other examples, the handover between the 3G and the 4G network can be performed further based on the MME 104 transmitting to the non-5G network compatible PGW (e.g., the PGW 106 or the PGW 110), and via the SGW, a create session request message to request establishment of an IP multimedia system (IMS) PDN connection utilized by the UE 102 to access a PDN, and based on the MME 104 receiving, from the non-5G network compatible PGW (e.g., the PGW 106 or the PGW 110) and via the SGW, a create bearer request message, the create bearer request message being received based on a policy charging and control (PCC) rule (e.g., a PCC rule received by the non-5G network compatible PGW (e.g., the PGW 106 or the PGW 110) and from a policy and charging rules function (PCRF)), the create bearer request message being utilized by the MME to request the UE 102 to utilize a bearer based on the bearer contexts.

In those or other examples, the handover between the 3G and the 4G network can be performed further based on the MME 104 receiving from the non-5G network compatible PGW (e.g., the PGW 106 or the PGW 110), and via the SGW, a create bearer request message, the create bearer request message being received based on the PCC rule, the create bearer request message being utilized by the MME 104 to request the UE 102 to utilize a bearer based on the bearer contexts. The 3G-4G handover can be performed further based on the MME 104 transmitting to the first PGW, and via the SGW, a create bearer response message to the non-5G network compatible PGW (e.g., the PGW 106 or the PGW 110), and via the SGW, to complete the handover from the 3G network to the 4G network, the 4G network being utilized by the UE 102 for exchanging communications via the IMS PDN connection.

Although the MME 104 can be utilized for the 3G communication connection 202 and/or the 4G communication connection 204, as discussed above in this disclosure, it is not limited as such. One or more MMEs, including the MME 104 and/or one or more other MMEs being integrated with, and/or separate from, the MME 104 can be utilized for the 3G communication connection 202 and/or the 4G communication connection 204. The one or more MMEs, including the MME 104 and/or one or more other MMEs, can be implemented for any of the techniques as discussed herein in a similar way as for the MME 104.

In some examples, a handover (e.g., a second handover) between the 4G network and a fifth generation (5G) network can be initiated for the UE 102. The 4G-5G handover can be initiated based on the MME 104 receiving, from a an evolved-universal mobile telecommunications system (UMTS) terrestrial radio access network) (E-UTRAN) in the 4G network, a second handover initiation message, and further based on the MME 104 transmitting, to the AMF 112 in the 5G network, a handover request message (e.g., a third handover request message), and based on the MME 104 receiving, from the AMF 112, a context request message (or "context request") 206 utilized to request PGW identity information. The context request 206 can be implemented in a similar way as the context request 116, as discussed above with reference to FIG. 1.

In those or other examples, an exclusion of PDN information (e.g., an exclusion of PDN information in a context response (e.g., the context response 210, as discussed below)) 208, can be determine by the MME 104. The MME 104 can refrain from utilizing PDN information (e.g., first PDN information including a PGW fully qualified domain name (FQDN) (e.g., a first FQDN) of the PGW identity information associated with the non-5G network compatible PGW (e.g., the PGW 106 or the PGW 110)) associated with a PDN (e.g., the IMS PDN utilized for the 4G communication connection 204) to generate the context response 210. The MME 104 can generate and transmit, to the AMF 112, the context response 210, which can be implemented in a similar way as the context response 118, as discussed above with reference to FIG. 1.

The MME 104 can leave out the PDN information from the context response 210 based on determining a current PGW (e.g., the PGW 106 or the PGW 110) associated with a current communication connection (e.g., a non-5G network communication connection) is not compatible (e.g., incompatible) with the 5G network. In those or other examples, the MME 104 can transmit the context response 210 without the PDN information based on determining the current PGW (e.g., the PGW 106, the PGW 110, etc.) is unusable as a session management function (SMF) of the 5G network.

In those or other examples, the AMF 112 can transmit, to the MME 104, an acknowledgement (or "confirmation") (or "confirmation message") of a 5G communication connection (e.g., 5G PDN connection) being setup for the UE 102 to exchange communications via the 5G network. The acknowledgement can be transmitted based on an omission of the NRF query 212. The omission of the NRF query 212 can be utilized by the AMF 112 to avoid unnecessarily querying the NRF. The 5G PDN connection being established can enable the UE 102 to utilize the 5G network based on PDN information (e.g., second PDN information including a FQDN (e.g., a second FQDN) associated with a 5G network compatible SMF (e.g., the 5G compatible SMF 114, as discussed above with reference to FIG. 1)), the SMF FQDN and/or the SMF 114 being identified by the AMF 112. The 5G PDN connection can be established for the UE 102 to utilize the 5G network, via a 5G communication connection 214.

The 5G communication connection 214 can be established by utilizing the UE 102, the NRF 108, and the AMF 112, as represented in FIG. 2 by solid lines of portions the 5G communication connection 214 associated with the UE 102, the NRF 108, and the AMF 112. In some examples, the 5G communication connection 214 can established without utilizing the MME 104, as represented in FIG. 2 by dotted lines of portions of the 5G communication connection 214 associated with the MME 104.

The 5G communication connection 214 can be established utilizing the 5G compatible SMF 114, based on a previous network connection (e.g., the 4G communication connection 204) utilizing the non-5G network compatible PGW (e.g., the PGW 106 or the PGW 110). Because the NRF would be unable to identify SMF information based on the PDN information (e.g., the FQDN) associated with the non-5G network compatible PGW (e.g., the PGW 106 or the PGW 110), the NRF would not be able to successfully process an NRF query (or "NRF query message"). The AMF 112 can avoid transmitting the NRF query, based on the AMF 112 identifying the PDN information is missing from the context response 210.

In some examples, the MME 104 can manage session information in similar ways as discussed above with reference to FIG. 1, based on the context request 206 being received, and based on the 4G communication connection 204 utilizing the non-5G network compatible PGW (e.g., the PGW 106 or the PGW 110). In those or other examples, the MME 104 can delete the session information at any of various times based on the context request 206 being received. The MME 104 can delete the session information based on the context request 206 being received, and then transmit the context response 210 without the PDN information based on determining an absence of the session information. The MME 104 can delete the session information based on the acknowledgement being received from the AMF 112, the acknowledgement being transmitted by the AMF 112 based on the AMF 112 determining the 5G communication connection 214 is successfully established.

Figure 3:
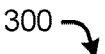
FIG. 3 is a flow diagram of an illustrative process for performing cellular session management for user equipment (UEs) in idle mode, in accordance with examples of the disclosure.

FIG. 3 is a flow diagram of an illustrative process 300 for performing cellular session management for user equipment (UEs) in idle mode, in accordance with examples of the disclosure. At least part of the process 300 may be performed by a UE (e.g., the UE(s) 102), a mobile management entity (MME) (e.g., the MME 104), one or more packet data network (PDN) gateways (PGW) (e.g., the 3G PGW 106, the 4G PGW 110, etc.), a network function (NF) repository function (NRF) (e.g., the NRF 108), an access and mobility management function (e.g., the AMF 112), and a session management function (e.g., the 5G SMF 114), as discussed above with reference to FIG. 1, and/or by any other suitable computing device(s), as described herein.

At operation 302, the process can include transmitting, by an MME (e.g., the MME 104), a handover request message. The handover request message can be transmitted to an AMF (e.g., the AMF 112) in a 5G network to request a handover for a user equipment (e.g., the UE 102).

At operation 304, the process can include receiving, by the MME 104 and from the AMF 112, a context request message (e.g., the context request 116) utilized to request PDN information. The MME 104 can identify, based on receiving the context request, that a current network connection (e.g., a 4G network connection) is being utilized by the UE 102, and that the 4G network connection is utilizing a non-5G network compatible PGW (e.g., the PGW 106 or the PGW 110).

At operation 306, the process can include transmitting, by the MME 104 and to the AMF 112, a context response 118 without the PDN information. The context response 118 can be utilized by the AMF 112 to perform an initial setup.

Figure 4:
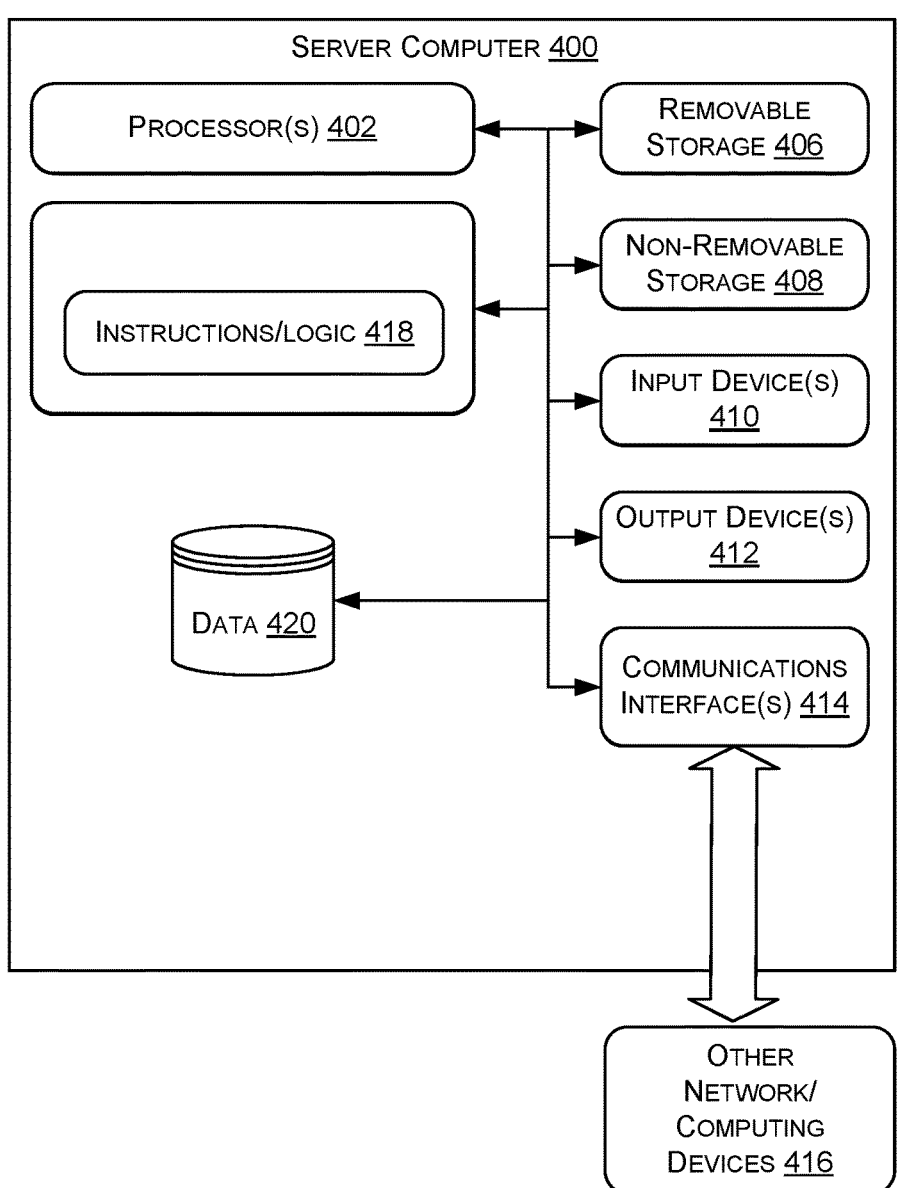
FIG. 4 is a block diagram of an example server computer utilized to implement management systems, in accordance with some examples of the present disclosure.

FIG. 4 is a block diagram of an example server computer 400 utilized to implement management systems, in accordance with some examples of the present disclosure.

The server computer 400 may be representative of an individual node (or network element) (e.g., a node of the network environment 100, as discussed above with reference to FIG. 1) or multiple nodes (or network elements) (e.g., multiple nodes of the network environment 100) of the MTN.

As shown, the server computer 400 may include one or more processors 402 and one or more forms of computer-readable memory 404. The server computer 400 may also include additional storage devices. Such additional storage may include removable storage 406 and/or non-removable storage 408.

The server computer 400 may further include input devices 410 (e.g., a touch screen, keypad, keyboard, mouse, pointer, microphone, etc.) and output devices 412 (e.g., a display, printer, speaker, etc.) communicatively coupled to the processor(s) 402 and the computer-readable memory 404. The server computer 400 may further include communications interface(s) 414 that allow the server computer 400 to communicate with other computing devices 416 (e.g., other nodes, a UE(s), etc.) such as via a network. The communications interface(s) 414 may facilitate transmitting and receiving wired and/or wireless signals over any suitable communications/data technology, standard, or protocol, as described herein.

In various embodiments, the computer-readable memory 404 comprises non-transitory computer-readable memory 404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 404 may also be described as computer storage media and may include volatile and nonvolatile, removable and non-removable media implemented in any method or technology for storage of information, such as computer readable instructions, data structures, program modules, or other data. Computer-readable memory 404, removable storage 406 and non-removable storage 408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 400. Any such computer-readable storage media may be part of the server computer 400.

The memory 404 can include logic 418 (i.e., computer-executable instructions that, when executed, by the processor(s) 402, perform the various acts and/or processes disclosed herein) to implement synchronization of subscriber data, according to various examples as discussed herein. For example, the logic 418 is configured to carry out signaling and/or communications associated with and the UE(s) 102, the network nodes (e.g., the MME 104, the PGW 106, the NRF 108, the PGW 110, the AMF 112, and the SMF 114, as discussed herein). The memory 404 can further be used to store data 420, which may be used to implement synchronization of subscriber data, as discussed herein. In one example, the data 420 may include network information (e.g., the network information, as discussed above with reference to FIG. 1) and/or mobile device information (e.g., the mobile device information, as discussed above with reference to FIG. 1).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:

receiving, by a mobile management entity (MME) and from an evolved-universal mobile telecommunications system (UMTS) terrestrial radio access network) (E-UTRAN) in a fourth generation (4G) network, a handover initiation message utilized to initiate a handover for a user equipment (UE) operating in idle mode;

transmitting, by the MME and to an access and mobility management function (AMF) in a fifth generation (5G) network, a handover request message based on the handover initiation message;

receiving, by the MME and from the AMF, a context request message utilized to request a first fully qualified domain name (FQDN) associated with a packet data network (PDN) gateway (PGW);

performing, by the MME, one or more domain name system (DNS) queries to identify service tag information associated with the PGW, the service tag information indicating whether the PGW supports 5G network compatibility;

determining, by the MME and based on the one or more DNS queries, that the service tag information indicates the PGW is compatible with third generation (3G) and fourth generation (4G) networks but not compatible with the 5G network;

deleting, by the MME and based at least in part on the context request message and the determination that the PGW is not compatible with the 5G network based on the service tag information, first PDN information associated with the first FQDN prior to transmitting a context response message without the first PDN information to prevent the AMF from transmitting unnecessary queries to a network function (NF) repository function (NRF);

transmitting, by the MME and to the AMF, the context response message;

receiving, by the MME and from the AMF, and based on the first PDN information associated with the first FQDN being absent from the context response message, a confirmation message indicating a 5G network PDN connection established by the AMF through an initial setup process instead of a 4G-5G handover process, the 5G network PDN connection being established utilizing second PDN information identified by the AMF, the second PDN information including a second FQDN associated with a session management function (SMF); and utilizing, by the MME, the 5G network PDN connection to exchange communications with the 5G network.

2. The method of claim 1, wherein the 5G network PDN connection is established based on the AMF determining to refrain from transmitting a query message to a network function (NF) repository function (NRF), the AMF determining to refrain from transmitting the query message based on the context response message not including the first PDN information.

3. The method of claim 1, wherein the handover initiation message is a 4G-5G handover initiation message, and the handover is a 4G-5G handover, further comprising:

receiving, by the MME and from a mobile switching center (MSC) server in a third generation (3G) network, a third-generation (3G)-4G handover initiation message utilized to initiate a 3G-4G handover from a 3G network to the 4G network; and transmitting, by the MME and to the PGW, via a serving gateway (SGW), a bearer message to perform the 3G-4G handover based on the handover initiation message, the 4G network being utilized by the UE based on completion of the 3G-4G handover for exchanging communications via an IP multimedia system (IMS) PDN connection.

4. The method of claim 1, wherein the context request message includes security related information utilized to register the UE with the 5G network, and wherein transmitting the context response message further comprises transmitting the context response message without the first PDN information, the AMF transmitting the confirmation message based on the AMF refraining from transmitting a query for session management function (SMF) information.

5. The method of claim 1, wherein the confirmation message is transmitted by the AMF based on the AMF receiving the context request message, registering the UE, transmitting an initial registration request message including UE information associated with the UE to a unified data management (UDM), and receiving a registration response message from the UDM.

6. The method of claim 1, wherein the confirmation message is received from the AMF based on the AMF refraining from configuring a session management function (SMF) as part of the handover based on the handover request message, the AMF determining to refrain from configuring the SMF based on the context response message being received from the MME and without the first PDN information.

7. The method of claim 1, wherein the 5G network PDN connection to be utilized by the UE is established based on the AMF ending a 4G session and establishing a 5G session, the 5G session being established based on the PGW being unusable as a session management function (SMF) of the 5G network.

8. The method of claim 1, wherein the first PDN information is deleted by the MME.

9. The method of claim 1, wherein the first PDN information is deleted based at least in part on the service tag information indicating one or more PGWs being utilized to manage non-5G network communication connections for the UE.

10. A system comprising:
at least one processor; and memory storing instructions that, when executed by the at least one processor, cause the at least one processor to perform operations comprising:

transmitting, by a mobile management entity (MME) and to an access and mobility management function (AMF) in a fifth generation (5G) network, a handover request to request a handover for a user equipment (UE);

receiving, by the MME and from the AMF, a context request message utilized to request 5G session management function (SMF) information associated with an SMF;

generating, by the MME, a context response without packet data network (PDN) information and including non-5g network PDN gateway (PGW) identity information stored in the MME, the non-5G network PGW identity information including a fully qualified domain name (FQDN);

receiving, by the MME and from the AMF, a confirmation indicating a 5G network PDN connection usable by the UE to exchange communications via the 5G network, the 5G network PDN connection being established utilizing second PDN information identified by the AMF, the second PDN information including a second FQDN associated with a session management function (SMF);

performing, by the MME, one or more domain name system (DNS) queries to identify service tag information associated with the PGW, the service tag information indicating whether the PGW supports 5G network compatibility;

determining, by the MME and based on the one or more DNS queries, that the service tag information indicates the PGW is compatible with third generation (3G) and fourth generation (4G) networks but not compatible with the 5G network;

deleting, by the MME and based at least in part on the context request message and the determination that the PGW is not compatible with the 5G network based on the service tag information, the PDN information prior to transmitting the context response without the PDN information to prevent the AMF from transmitting unnecessary queries to a network function (NF) repository function (NRF); and transmitting, by the MME and to the AMF, the context response.

11. The system of claim 10, wherein the PDN information is first PDN information, and the operations further comprising:

setting a session information delete flag based at least in part on the confirmation; and deleting, by the MME, the first PDN information based at least in part on the session information delete flag being set.

12. The system of claim 10, wherein generating the context response without the PDN information further comprises storing the PDN information until a confirmation is received from the AMF, the confirmation indicating a 5G network PDN connection established by the AMF.

13. The system of claim 10, wherein generating the context response without the PDN information further comprises:

deleting the PDN information; and setting a session information deleted flag, and wherein transmitting the context response further comprises transmitting, by the MME and to the AMF, the context response based at least in part on the session information deleted flag being set.

14. The system of claim 10, wherein the operations further comprising:

receiving, by the MME and from the AMF, a confirmation indicating a 5G network PDN connection established by the AMF;

setting a session delete flag based at least in part on the confirmation; and transmitting the session delete flag to a session gateway (SGW), the SGW forwarding the session delete flag to a PGW, the PGW deleting session information based at least in part on the session delete flag, the session information including an international mobile subscriber identity (IMSI) associated with a previous session utilized by the UE.

15. The system of claim 10, wherein the operations further comprising:

receiving, by the MME and from the AMF, a confirmation indicating a 5G network PDN connection, the 5G network PDN connection being established based at least in part on the AMF utilizing the context request to determine to refrain from transmitting a query to a network function (NF) repository function (NRF).

16. The system of claim 10, the operations further comprising:

utilizing, by the MME and prior to transmitting the handover request, a third generation (3G) network to exchange communications for the UE; and identifying, by the MME and prior to transmitting the handover request, a handover for the UE and from a 3G network to a fourth generation (4G) network, wherein a confirmation is transmitted by the AMF based at least in part on the AMF utilizing establishment of a PDN connection to determine to transmit the confirmation, a PGW in the 4G network not being compatible with the 5G network, the 5G network including the SMF.

17. The system of claim 10, wherein, prior to the handover request being transmitted, the UE utilizes a third generation (3G) PDN connection including a PGW to exchange communications via a 3G network, the operations further comprising performing, by the MME and prior to transmitting the handover request, a handover for the UE and from the 3G network to a fourth generation (4G) network, the handover being performed based at least in part on i) a UE context release performed by a NodeB of the 3G network, and ii) a resource allocation performed by an eNodeB of the 4G network, the PDN information being omitted from the context response based at least in part on the PGW being compatible with the 3G network and the 4G network but not the 5G network.

18. A server comprising:

at least one processor; and memory storing instructions that, when executed by the at least one processor, cause the at least one processor to perform operations comprising:

transmitting, by a mobile management entity (MME) and to an access and mobility management function (AMF) in a fifth generation (5G) network, a handover request;

receiving, by the MME and from the AMF, a context request message utilized to request first packet data network (PDN) information based at least in part on the handover request;

receiving, by the MME and from the AMF, a confirmation indicating a 5G network PDN connection usable by a user equipment (UE) to exchange communications via the 5G network, the 5G network PDN connection being established utilizing 5G network PDN information, the 5G network PDN information including an FQDN associated with a session management function (SMF);

performing, by the MME, one or more domain name system (DNS) queries to identify service tag information associated with a PGW, the service tag information indicating whether the PGW supports 5G network compatibility;

determining, by the MME and based on the one or more DNS queries, that the service tag information indicates the PGW is compatible with third generation (3G) and fourth generation (4G) networks but not compatible with the 5G network;

deleting, by the MME and based at least in part on the context request message and the determination that the PGW is not compatible with the 5G network based on the service tag information, second PDN information prior to transmitting a context response message without the second PDN information to prevent the AMF from transmitting unnecessary queries to a network function (NF) repository function (NRF); and transmitting, by the MME and to the AMF, the context response without the second PDN information, the context response being utilized by the AMF to perform an initial setup.

19. The server of claim 18, wherein the second PDN information is non-5G network PDN information.

20. The server of claim 18, wherein the second PDN information is non-5G network PDN information, and receiving the context request further comprises deleting, by the MME, the non-5G network PDN information.

* * * * *